United States Patent [19]
Buonanno

[11] 3,941,543
[45] Mar. 2, 1976

[54] FLEXIBLE CONTINUOUS MOLD SYSTEM

[75] Inventor: Samuel S. Buonanno, Rochester, N.Y.

[73] Assignee: Schlegel Corporation, Rochester, N.Y.

[22] Filed: Aug. 5, 1974

[21] Appl. No.: 494,408

[52] U.S. Cl.............. 425/371; 425/329; 425/436 R; 425/450.1; 425/451
[51] Int. Cl.² ......................................... B29C 15/00
[58] Field of Search ........... 425/371, 329, 115, 436, 425/450.1, 451

[56] References Cited
UNITED STATES PATENTS

| | | | |
|---|---|---|---|
| 1,465,326 | 8/1923 | Zimmer | 425/447 |
| 2,668,987 | 2/1954 | Harris et al. | 425/113 X |
| 2,817,875 | 12/1957 | Harris et al. | 425/329 X |
| 3,462,795 | 8/1969 | Hermanns | 425/371 |
| 3,700,368 | 10/1972 | Wells | 425/363 X |
| 3,781,390 | 12/1973 | Wells | 264/46.2 |

Primary Examiner—Robert L. Spicer, Jr.
Attorney, Agent, or Firm—George W. Shaw

[57] ABSTRACT

A mold system uses a pair of mold parts formed as continuous loops of resin extrusion, and the mold parts have generally dovetail-shaped side edge projections. Two continuous loops of flexible and springy retainer strips coated with a resin covering are formed in a general U shape in cross section and are clipped respectively over the side edge projections of the mold parts. The retainer strips are flexible enough to follow a curved path with the mold parts closed to hold a molded product, and the retainer strips allow the mold parts to be made of the most suitable material without having to snap tightly together without external assistance. Longer mold life can be achieved with the retaining force being provided by simple and easily replaceable retainer strips.

10 Claims, 12 Drawing Figures

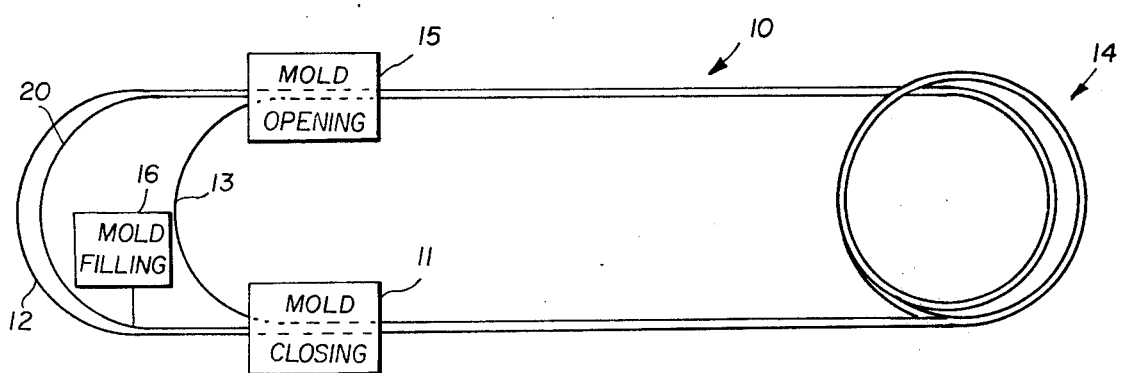
FIG. 1
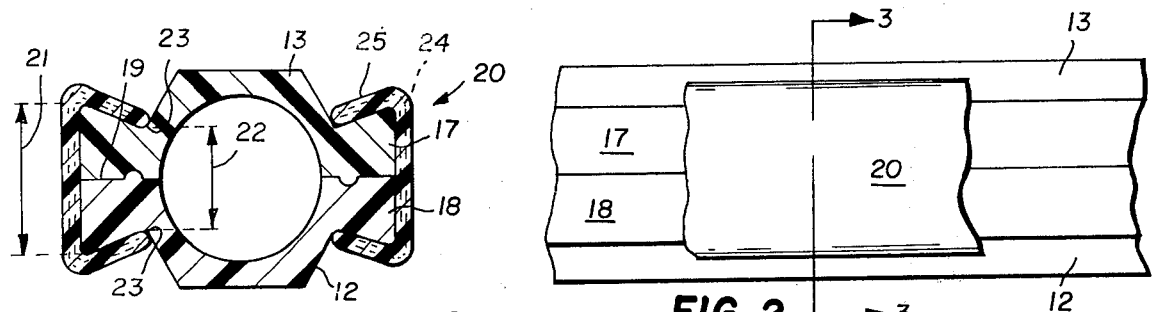
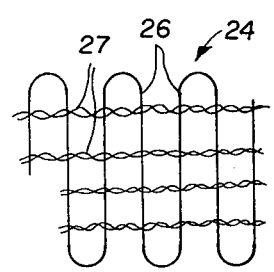
FIG. 3
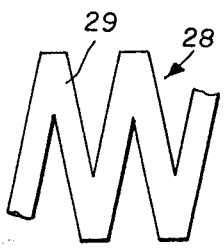
FIG. 2
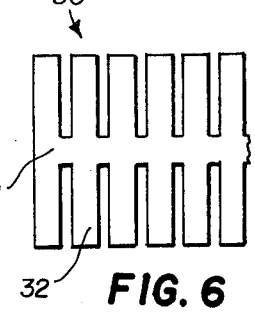
FIG. 5
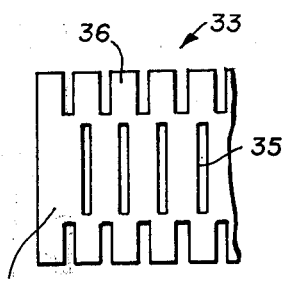
FIG. 6  FIG. 7
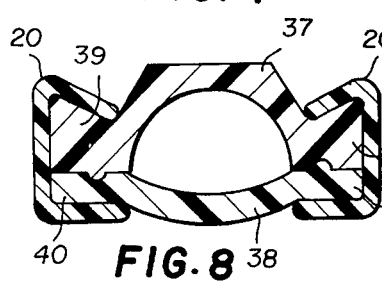
FIG. 4
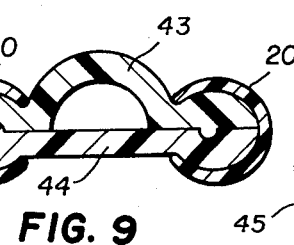
FIG. 8
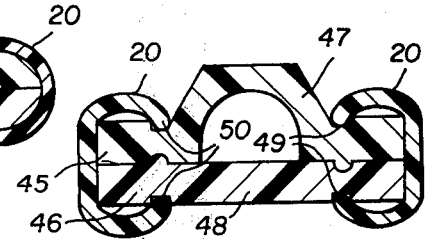
FIG. 9  FIG. 10
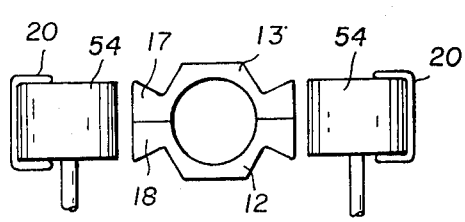
FIG. 12
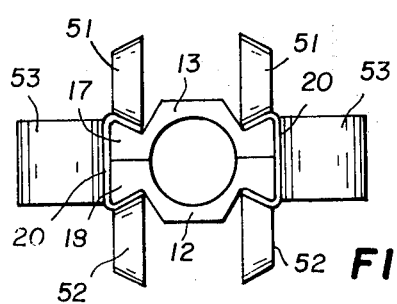
FIG. 11

FLEXIBLE CONTINUOUS MOLD SYSTEM

Continuous molding in resin loop mold parts that follow a curved path while closed to hold a molded product has been suggested in U.S. Pat. Nos. 3,700,368 and 3,781,390. Such a process works well and allows high-speed molding, but it involves considerable problems in maintaining mold parts in working condition. The invention involves an analysis of these problems and suggests a better system for such continuous molding.

One problem is release of the molded product from the mold parts, and some resin materials have much better release properties than others, so that the most desirable molds would be made of relatively easy release resin materials. However, when the mold parts themselves have to be flexed and have sufficient resilience to snap together with a firm interlock to retain the molded product, then flex life of the mold parts is also an important consideration and also requires that certain resin materials be used. Compromises on the flex life requirements and the release requirements dictate resin materials that are difficult to extrude with the desired accuracy to form satisfactory molds. Mold parts can fail by losing their capacity to interlock together even though they may still have plenty of wear left in their cross-sectional mold surface shape. Also, mold parts have to be matched together, and if one part becomes worn, both parts have to be replaced. In addition, any change in mold design requires changes in locking rolls to press the mold parts together.

All of these problems cause substantial difficulty when mold parts are several hundred feet in length and expensive to replace, and the invention involves recognition of a way that mold parts can be made more simply and can be held together not by a resilient interlock in the mold parts themselves, but by a particular form of flexible and resilient retainer strip also formed in continuous lengths and snapped over the side edges of the mold parts when the mold parts are closed. The invention aims at simplicity, economy, formation of mold parts from more advantageous resin materials, simpler mold shapes, longer wear life for molds, and a simpler and cheaper way of retaining mold parts together as the molded product cures.

SUMMARY OF THE INVENTION

The inventive continuous mold system applies to a pair of mold parts formed as continuous loops of resin extrusions closable along a parting plane and flexible enough to follow a curved path while closed to hold a molded product. Each of the mold parts has opposite side edge projections extending laterally outward along the parting plane, and the side edge projections fit together in abutting relation when the mold parts are closed. The laterally outer extremities of the fitted-together side edge regions are thicker than the laterally inward portion of each of the fitted-together side edge regions. Two continuous loops of flexible and springy retainer strip each substantially the length of the mold parts are coated with a resin material covering the retainer strip and are each generally U-shaped in cross section to clip respectively over the side edge projections and resiliently bias the side edge projections closed against each other. The longitudinal edges of the retainer strips extend to the laterally inward portions of each of the side edge projections, and the retainer strips are flexible transversely to the longitudinal extent of the retainer strips for following the curved path of the mold parts. Clipping means ahead of the curved path clip the retainer strips onto the closed mold parts, and removing means arranged after the curved path remove the retainer strips from the closed mold parts.

DRAWINGS

FIG. 1 schematically shows a preferred embodiment of the invention applied in the general environment of a continuous loop molding system;

FIG. 2 is an enlarged, fragmentary, and partially cut-away elevational view of a closed and locked mold as preferred according to the invention;

FIG. 3 is a cross-sectional view of the mold of FIG. 2 taken along the line 3—3 thereof;

FIGS. 4–7 are partially schematic, plan views of various preferred ways of forming resilient base materials for retainer strips used in the invention;

FIGS. 8–10 are cross-sectional views of three examples of differing mold shapes usable in the inventive system;

FIG. 11 is a partially schematic, elevational view of a device for clipping retainer strips onto a closed mold; and FIG. 12 is a partially schematic, fragmentary view of a device for removing the retainer strips from a closed mold.

DETAILED DESCRIPTION

Molding system 10 as schematically shown in FIG. 1 includes a mold-closing station 11 for closing an outer mold part 12 and an inner mold part 13 which are then driven through a curved path 14 while the molded product cures. When curing is completed, the mold parts are separated at a mold-opening station 15, and the outer mold part 12 is refilled at mold filling station 16. Curved path 14 can be a helix of many turns, and by keeping mold parts 12 and 13 together during most of their travel, high-speed molding can be accomplished because of the relatively long length of the curing path. Many of the details for preferred ways of operating such a continuous molding system are disclosed in previous U.S. Pat. Nos. 3,700,368 and 3,781,390.

The inventive molding system differs from previous suggestions in providing a better way for locking the mold parts 12 and 13 together during their travel through curved path 14, and FIGS. 2 and 3 show one preferred example of how this is done. Mold parts 12 and 13, which happen to be identical, but reversed relative to each other in the embodiment of FIGS. 2 and 3, each have respective side edge projections 17 and 18 extending laterally outward along parting plane 19. Retainer strips 20 are clipped over projections 17 and 18 to hold mold parts 12 and 13 together, and the invention involves the characteristics of a satisfactory retainer clip 20 and its relationship to mold parts 12 and 13, and suitable ways of clipping on and removing retainer 20.

Side edge projections 17 and 18 fit together in abutting relation as illustrated when mold parts 12 and 13 are closed, and the laterally outer extremities of mold parts 17 and 18 have a thickness dimension 21 greater than the thickness dimension 21 of a laterally inward portion of projections 17 and 18. Projections 17 and 18 when abutted together as illustrated in FIG. 3 thus have a generally dovetailed shape. Retainer 20 has a corresponding dovetailed shape to clip over the outer extremities of projections 17 and 18 and squeeze inward on the laterally inward portion of projections 17 and 18 at their thinner dimension 22.

Retainer strips 20 are each formed in continuous loops of substantially the length of mold parts 12 and 13 and each have a flexible and springy base 24 covered with a coating 25 of a resin material. Retainer strips 20 are formed into a general U shape in cross section such as the dovetailed shape illustrated in FIG. 3 for fitting over projections 17 and 18 of mold parts 12 and 13.

It is important that retainers 20 be resilient, springy, and flexible enough to be clipped on and off the mold parts and also be able to travel through curved path 14 without releasing the mold parts or coming loose from the mold parts. It is also important that retainers 20 be simple and economical to make and handle so that they can be formed easily in long lengths and replaced inexpensively if necessary. These requirements are met by a base material 24 schematically shown in FIG. 4 as formed of wire loops 26 formed in a zig-zag pattern and secured together by longitudinally extending stitched or knitted threads 27. The resilience and strength of base 24 can be determined by selecting wire 26 of the proper material, size, and tensile strength, and stitching 27 keeps wire loops 26 in place, supports and maintains the desired pattern of loops 26, and keeps base 24 from being longitudinally stretchable. A coating of resin material 25 covering base 24 makes a satisfactory retainer strip 20 when base 24 is formed into the desired cross-sectional shape.

Preferred alternatives to zig-zag wire base 24 are the cut and expanded metal base 28 of FIG. 5 having metal legs 29 formed in a zig-zag pattern and preferably made from a die-cut strip of sheet metal. Knitted or stitched threads can also be applied to base 28 if desired. Another preferred alternative is base 30 of FIG. 6 formed of a die-cut sheet metal strip to provide a relatively narrow central strip 31 and independent side fingers 32. Base 33 of FIG. 7 is also die-cut from sheet metal with a wider central strip 34 having perforations 35 and independent side edge fingers 36. Bases 28, 30, and 33 are preferably coated with a resin coating 25 just as preferred for base 24, and the resulting retainer strip 20 formed with any of the illustrated bases is resilient, springy, flexible transversely relative to its longitudinal extent and suitable for repeatedly clipping on and off mold parts and travelling with the mold parts through a curved path.

Variations in mold shape and retainer strip shape are shown in FIGS. 8–10. Mold part 37 has dovetailed shaped side edge projections 39, and mold part 38 has straight side edge projections 40 to show that the dovetail effect can be made by shaping the side edge projections of one mold part only. Also, the cavity between mold parts 37 and 38 has a different shape. Retainer strip 20 has a shape fitting projections 39 and 40, and similar to the shape shown in FIG. 3. Projections 41 and 42 of mold parts 43 and 44 of the embodiment of FIG. 9 are rounded in cross section as illustrated, and retainer strips 20 have a corresponding rounded or partial cylindrical shape to clip over and hold projections 41 and 42 together. Projections 45 and 46 of mold parts 47 and 48 of FIG. 10 each have notches 49, and retainer strips 20 have in-turned free ends 50 fitting into notches 49 to lock projections 45 and 46 tightly together. FIGS. 8–10 show a few of the many possibilities for mating shapes between side edge projections for mold parts and retainer strips 20, and many more configurations can be made within the spirit of the invention.

Retainer strips 20 can become deformed or bent during use, and can lose their desired cross-sectional shapes for firmly gripping closed mold parts, so that forming rollers are preferred at mold closing station 11 for pressing retainer strip 20 back into the desired shape for a tight fit on the mold parts. This is best shown in FIG. 11 where forming rollers 51 and 52 squeeze the side edges of retainer strip 20 tightly over projections 17 and 18 of mold parts 12 and 13 while another roller 53 presses retainer strip 20 laterally in place to form retainer strip 20 into the desired shape and press it tightly onto projections 17 and 18 to lock mold parts 12 and 13 securely together. Reforming of retainer strip 20 to the desired cross-sectional shape can also be done before it is clipped onto mold parts, and generally known forming rollers or cams can be used.

FIG. 12 schematically shows rollers 54 for forcing retainer strips 20 off of mold parts 12 and 13 so that the molds can be opened. Cams can be used instead of rollers 54, because lateral outward force is all that is required to unclip retainer strips 20 from a mold.

Between mold opening station 15 and mold closing station 11, retainer strips 20 are guided around the path between the open mold parts, the molded product is removed from between the mold parts, any necessary cleaning is accomplished, any mold liner is removed and replaced, one of the mold parts is refilled at station 16, the mold parts are fitted back together, and retainer strips 20 are reapplied preferably by a forming device such as shown in FIG. 11. Drive means (not shown) advances the mold parts throughout these operations, and retainer strips 20 follow along because of their engagement with the closed mold parts. Because the mold parts need not have any capacity for self-sustaining an interlocking relationship or for a long flex life to make this possible, the mold parts can be formed of more advantageous resin materials that are easier to extrude and offer a better release of the molded product. The overall expense is reduced because retainer strips 20 are very economical, and one pair of mold parts has a much longer wear life because of not having to flex during locking and unlocking. The interlock provided by retainer strips 20 is also more secure and thus reduces mold failures, but also does not add any appreciable complexity to the molding machine. In fact, locking and guide rollers in the machine can be standard for all molds, because such rollers are not involved in the interlock maintained by retainer strips 20. Some minor extra equipment at the mold opening and closing stations, and guideways between these stations is all that is required to achieve the many advantages of the inventive system compared to the best known prior art.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the many different shapes of mold parts and retainer strips and the ways of clipping on and removing the retainer strips within the spirit of the invention.

I claim:

1. In a mold system having a pair of mold parts formed as continuous loops of resin extrusions closable along a parting plane and flexible enough to follow a curved path while closed to hold a molded product, each of said mold parts having opposite side edge projections extending laterally outward along said parting plane and fitting together in abutting relation when said mold parts are closed, the improvement comprising:
   a. the laterally outer extremities of said fitted-together side edge projections being thicker than a laterally inward portion of each of said fitted-together side edge projections;
   b. two continuous loops of flexible and springy retainer strip each substantially the length of said mold parts;
   c. said retainer strips being formed of a springy metal element having a longitudinal pattern of side edge gaps;
   d. a resin coating covering each of said retainer strips;
   e. each of said retainer strips being generally U shaped in cross section to clip respectively over said side edge projections and resiliently bias said side edge projections into said abutting relation;
   f. the longitudinal edges of said retainer strips extending to said laterally inward portions of each of said side edge projections and being spaced apart by less than the thickness of said laterally outer extremities to form an interlock with said side edge projections;
   g. said retainer strips being flexible transversely relative to the longitudinal extent of said retainer strips for bending around said curved path with said mold parts;
   h. means arranged ahead of said curved path for clipping said retainer strips onto said closed mold parts and positioning said longitudinal edges of said retainer strips firmly against said laterally inward portions of said side edge projections to form said interlock; and
   i. means arranged after said curved path for removing said retainer strips from said closed mold parts.

2. The system of claim 1 wherein said spring metal element of each of said retainer strips is formed of wire in a transverse zig-zag loop pattern with longitudinal stitching linking loops of said wire together.

3. The system of claim 1 wherein said spring metal element of each of said retainer strips is formed of a flat metal strip arranged in a transverse zig-zag pattern.

4. The system of claim 1 wherein said spring metal element of each of said retainer strips is formed of a flat metal strip die-cut to form said edge gaps.

5. The system of claim 1 wherein said fitted-together side edge projections have a dovetail shape in cross section.

6. The system of claim 1 including forming means cooperating with said clipping means for restoring said retainer strips to said U shape for fitting back onto said side edge projections.

7. The system of claim 6 wherein said spring metal element of each of said retainer strips is formed of a flat metal strip arranged in a transverse zig-zag pattern.

8. The system of claim 6 wherein said spring metal element of each of said retainer strips is formed of a flat metal strip die-cut to form said edge gaps.

9. The system of claim 6 wherein said spring metal element of each of said retainer strips is formed of wire in a transverse zig-zag loop pattern with longitudinal stitching linking loops of said wire together.

10. The system of claim 9 wherein said fitted-together side edge projections have a dovetail shape in cross section.

* * * * *